United States Patent [19]

Curtis

[11] Patent Number: 4,974,190
[45] Date of Patent: Nov. 27, 1990

[54] PASS-THROUGH AND ISOLATION SWITCH

[75] Inventor: Robert A. Curtis, Hudson, Mass.

[73] Assignee: Digital Equipment Corporation, Maynard, Mass.

[21] Appl. No.: 280,149

[22] Filed: Dec. 5, 1988

[51] Int. Cl.⁵ .............................................. H04Q 9/00
[52] U.S. Cl. ............................... 364/900; 364/927.96; 364/933.9; 364/940.62; 340/825.5; 307/571
[58] Field of Search ... 364/200 MS File, 900 MS File; 307/239, 571; 340/825.5

[56] References Cited

U.S. PATENT DOCUMENTS

| | | | |
|---|---|---|---|
| 3,371,223 | 2/1968 | Gilbert | 307/239 |
| 4,498,133 | 2/1985 | Bolton et al. | 364/200 |
| 4,513,373 | 4/1985 | Sheets | 364/200 |
| 4,628,307 | 12/1986 | Crouse | 340/825.05 |
| 4,648,061 | 3/1987 | Foster | 364/900 |
| 4,677,588 | 6/1987 | Benjamin et al. | 364/900 |
| 4,803,485 | 2/1989 | Rypinski | 340/825.05 |

Primary Examiner—Thomas M. Heckler
Attorney, Agent, or Firm—Fish & Richardson

[57] ABSTRACT

A pass-through and isolation switch for connecting a terminal to a computer and for disconnecting the terminal from the computer without disrupting any sessions which may have been opened on the computer by the terminal. The switch includes a first gate and a second gate for switching in and out balanced termination loads across corresponding input terminals of the switch depending on the state of a control signal. And it includes a third gate and a fourth gate for preventing or allowing the passage of signals between the terminal and the computer, also depending upon the state of the control signal.

7 Claims, 2 Drawing Sheets

PASS-THROUGH AND ISOLATION SWITCH

FIELD OF THE INVENTION

This invention relates generally to the field of selector switches and, more particularly, to a selector switch which enables a computer terminal to select one of a plurality of processors to which it is connected.

BACKGROUND OF THE INVENTION

A terminal can communicate with a central processor only if it operates in accordance with the communications protocol that applies to that processor. In simple terms, the communications protocol is a set of rules defining the format, control and sequencing of message transfers within the computer system. Since computer manufacturers have not agreed to adopt a single, standard protocol defining the rules of communication over their computer systems, a number of different protocols are used. As a consequence, it is not uncommon for the equipment made by one manufacturer to be unable to communicate directly with the equipment made by another manufacturer. It is, however, often desirable, particularly from the user's point of view, that such communication be possible.

Indeed, if two central processors are available, each one on its own network and each one using a communication protocol which is different from the other processor, it may also be desirable that a terminal be capable of switching from one network to the other network while maintaining active sessions on both of them. A switching circuit may be required to provide such capability. However, the switching circuit must be able to switch the terminal from one network to the other network without disrupting communications on either one. Thus, for example, it must not generate noise or other signal transients which could be misinterpreted by either network and acted on as though they were valid messages. And it must switch quickly so as not to interfere with subsequent messages or control signals sent over either network.

SUMMARY OF THE INVENTION

The invention is an interface circuit for electrically connecting a computer terminal to and disconnecting the terminal from a network in response to a control signal. The interface circuit includes a switching circuit having a first port for transmitting signals to and receiving signals from the network and a second port for transmitting and receiving signals to and from the terminal, wherein the first port has a first line and a second line and the second port has a first line and a second line. The switching circuit includes a first switch, responsive to the control signal, for imposing a first impedance across the first port when the control signal is deasserted and for removing the first impedance from across the first port when the control signal is asserted; and a second switch, responsive to the control signal, for imposing a second impedance across the second port when the control signal is deasserted and for removing the second impedance from across the second port when the control signal is asserted. The switching circuit also includes a first gate, responsive to the control signal, for electrically connecting the first line of the first port with the first line of the second port when the control signal is asserted and for electrically isolating the first line of the first port from the first line of the second port when the control signal is deasserted; and a second gate, responsive to the control signal, for electrically connecting the second line of the first port with the second line of the second port when the control signal is asserted and for electrically isolating the second line of the first port from the second line of the second port when the control signal is deasserted.

In another aspect of the invention, the interface circuit also includes a first isolation transformer, which interfaces between the network and the switching circuit, and a second isolation transformer, which interfaces between the terminal and the switching circuit. The first isolation transformer has a first winding for connecting it to the network and it has a second winding with a first center tap connected to ground. The second winding of the first transformer is connected to the first port of the switching circuit. The second isolation transformer has a fourth winding for connecting it to the terminal and a fifth winding with a second center tap connected to ground. The fifth winding is connected to the second port of the switching circuit.

The circuit which embodies the invention effectively switches the terminal onto and off of the network without disrupting any of the sessions which the terminal may have opened over that network. Its effective operation is attributable in part to the balanced design of the circuit which tends to result in reduced signal transients during switching. In addition, concurrently with the switch isolating the terminal from the network it is also connecting termination impedances across the first port and the second port of the switch. The termination impedances may be selected to match the impedances of the coaxial lines connecting the interface to the network and the terminal. Matching the line impedances properly terminates the coaxial lines so as to reduce signal reflections which may be mistakenly treated as actual communication signals.

DETAILED DESCRIPTION OF THE PREFERRED EMBODIMENTS

Figure 1:
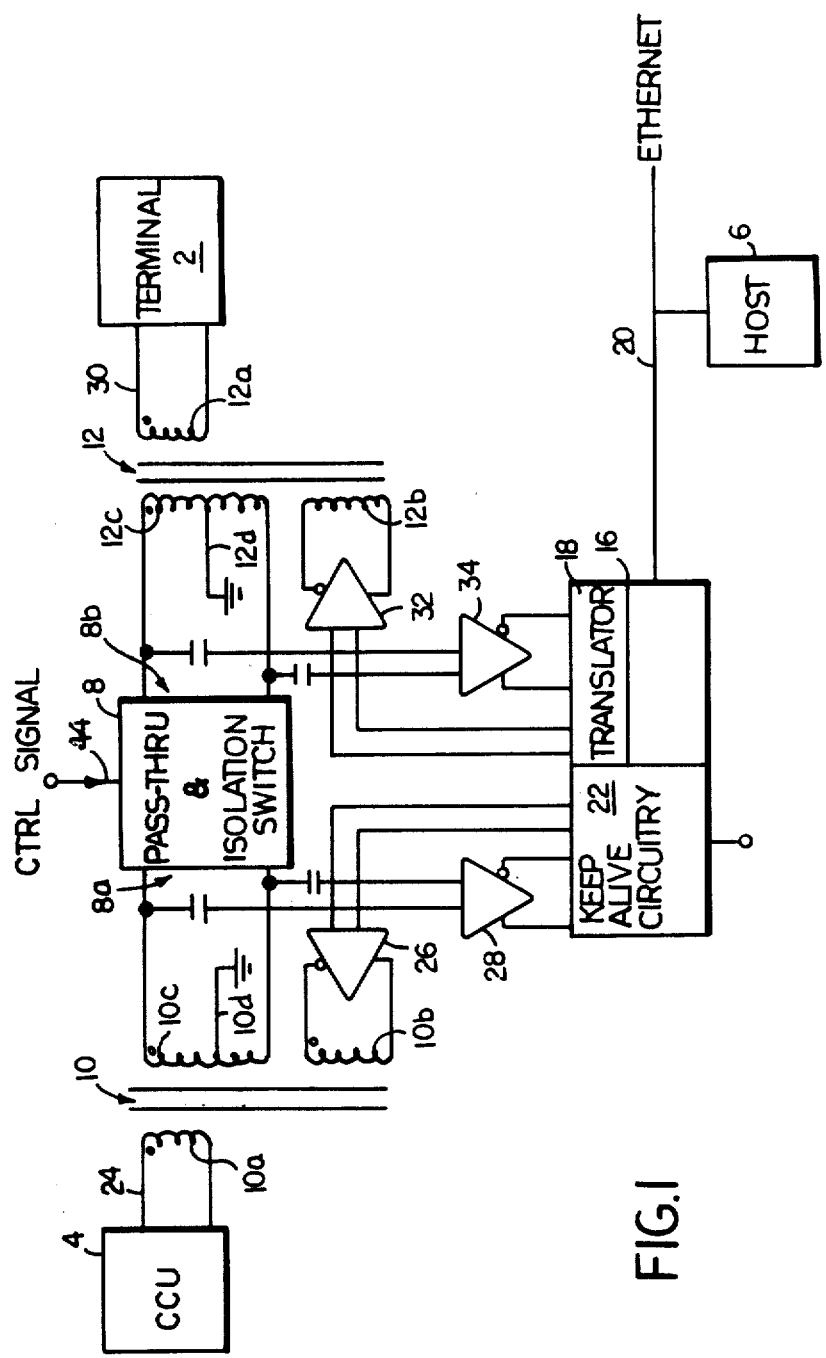
FIG. 1 is a block diagram of a system which embodies the invention.

FIG. 1 illustrates a system constructed in accordance with the invention. The system comprises a terminal 2, a central control unit (CCU) 4, a host computer 6 and a pass-through and isolation (PTI) switch 8 having a port 8a and a port 8b. The CCU 4 is electrically coupled to port 8a of the PTI switch 8 through an isolation transformer 10 and the terminal 2 is electrically connected to port 8b of the PTI switch 8 through an isolation transformer 12. The PTI switch 8 serves to electrically connect or disconnect the terminal 2 from the CCU 4, depending upon whether a CTRL control signal is either asserted or deasserted, respectively. When the CTRL control signal is asserted, the PTI switch 8 is in a pass-through mode, in which it couples signals from the terminal 2 to the CCU 4, and when the CTRL control signal is deasserted, it is in an isolation mode, in which it blocks the terminal 2 from the CCU 4. When the PTI switch 8 is in the isolation mode, an interface circuit 16 couples signals between the terminal 2 to the host computer 4, thereby enabling those two systems to communicate with each other.

In one specific embodiment, the terminal 2 is an IBM 3270 terminal, the CCU 4 is an IBM cluster control unit, the host 6 is a VAX computer sold by Digital Equipment Corporation (DEC) and the interface circuit 16 includes a translator 18. Since the IBM 3270 and the VAX computer communicate according to entirely different communication protocols, the translator 18 is provided to allow the terminal 2 and the DEC host 6 to communicate with each other. That is, it converts the signals coming from the terminal 2 from an IBM protocol into a protocol which conforms with the protocol of the host 6. And, it converts signals coming from the host 6 from a DEC protocol to a protocol which is compatible with the IBM terminal 2.

The PTI switch 8 is controlled by specific escape sequences which are entered by a user through the terminal 2. Control circuitry (not shown) receives the escape sequences and generates the corresponding CTRL control signal. When control circuitry receives the escape sequence corresponding to isolation mode, besides enabling the switch 8 to block communication between the terminal 2 and the CCU 4 it also enables the translator 16, which establishes a new communications path between the terminal 2 and the host 6 via a communication link 20, which may be an Ethernet.

In addition, the control circuitry enables a keep-alive circuit 22, which communicates through the isolation transformer 10 with the CCU 4. The keep-alive circuit 22 monitors polling signals sent by the CCU 4 and provides any responses necessary to maintain access to the applications which were opened by the terminal 2 through the CCU 4. Without the keep-alive circuit 22, the CCU 4 would not receive responses to its polling signals, would conclude that the terminal 2 has been disconnected and would then terminate access to any applications which had been opened through it. When the control circuitry receives the escape sequence corresponding to pass-through mode, it disables the keep-alive circuit 22 so that it no longer sends signals to the CCU 4 and it disables the translator 18 so that it no longer sends terminal signals to the host 6.

As illustrated in FIG. 1, the isolation transformer 10 has three separate windings, namely, a first winding 10a, a second winding 10b and a center-tapped winding 10c with its center tap 10d connected to ground. The CCU 4 is connected to the first winding 10a of the isolation transformer 10 by means of a line 24, the keep-alive circuit 22 sends signals to the second winding 10b via a first data driver 26, and port 8a of the PTI switch 8 is connected to the center-tapped winding 10c. The second winding 10b is also capacitively coupled to the input terminal of a first data receiver 28 whose output terminal is connected to the input terminal of the keep-alive circuit 22.

The isolation transformer 12 is similar in design and construction to the isolation transformer 10. It has three separate windings, namely, a first winding 12a, a second winding 12b and a center-tapped winding 12c with its center tap 12d also connected to ground. The terminal 2 is connected to the first winding 12a of the isolation transformer 12 by means of a line 30, the translator 18 sends signals to the second winding 12b via a second data driver 32, and port 8b of the PTI switch 8 is connected to the center-tapped winding 12c. The second winding 12b is also capacitively coupled to the input terminal of a second data receiver 34 whose output terminal is connected to an input terminal of the translator 18.

In one particular embodiment, the isolation transformers 10 and 12 are identically designed 1:1:1 transformers having input inductances of approximately 900 microhenries.

The first and second data receivers 28 and 34 are balanced-input/balanced-output circuits which serve similar functions. The first data receiver 28 converts Manchester signals received from the CCU 4 into TTL signals required by the keep-alive circuit 22. And, the second data receiver 34 converts Manchester signals received from the terminal 2 into TTL signals required by the translator 18.

Similarly, the first and second data drivers 26 and 32 are both balanced-input/balanced-output bus drivers which serve functions complementary to those of the first and second data receivers 28 and 34. That is, the first data driver 26 converts the TTL signals from the keep-alive circuit 22 into Manchester signals which are sent over the line 24 to the CCU 4. And, the second data driver 32 converts the TTL signals from the translator 18 into Manchester signals which can be sent over the line 30 to the terminal 2. In one particular embodiment, the Manchester signals sent over the lines 24 and 30 conform to a Manchester code with precharge.

Figure 2:
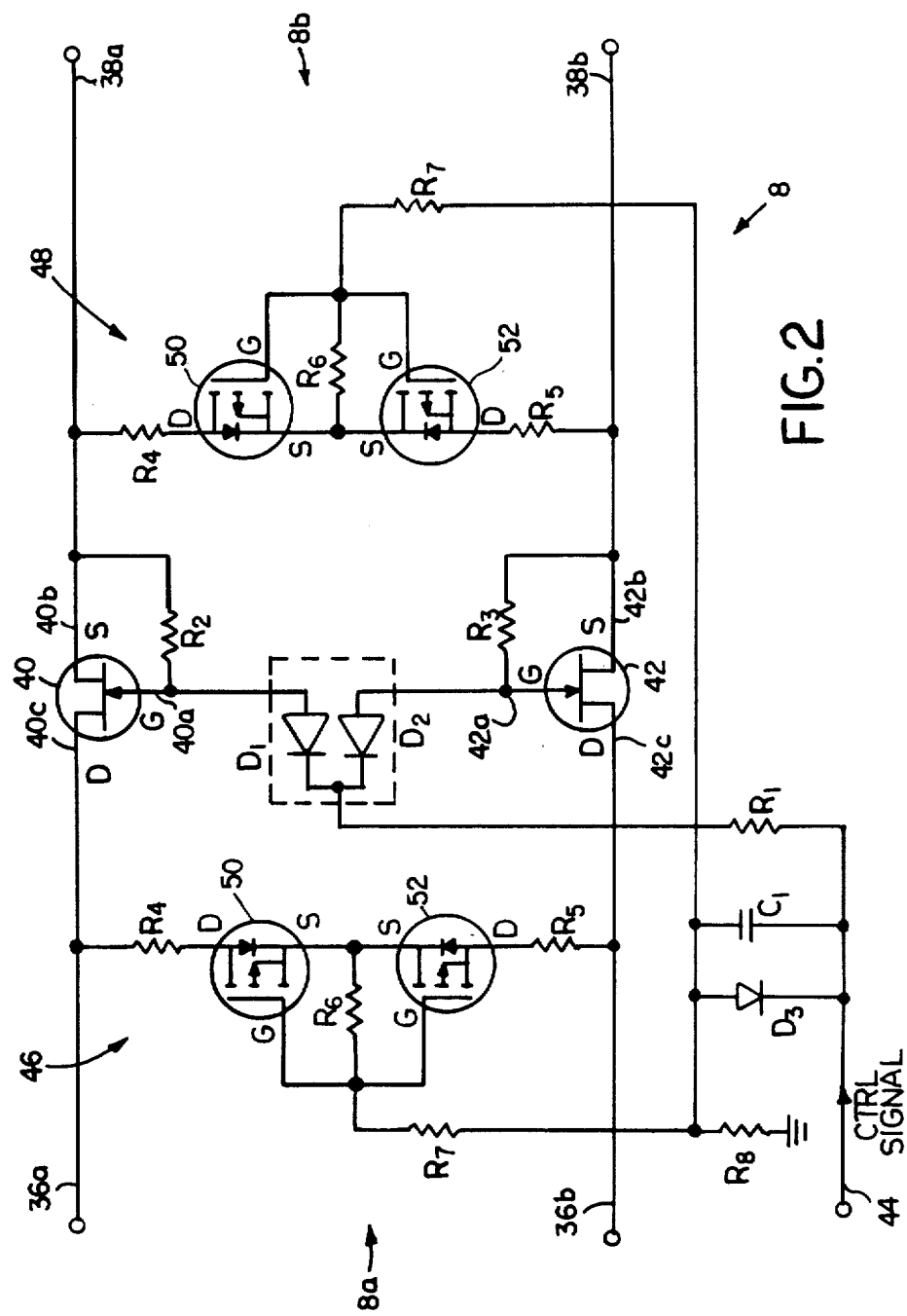
FIG. 2 is a circuit diagram of a pass-through and isolation switch used in the system depicted in FIG. 2.

The invention is further illustrated with the aid of FIG. 2 which depicts a schematic diagram of the PTI switch 8. Two junction field-effect transistors (JFET's) 40 and 42 operate as pass transistors to couple signals between port 8a to port 8b. A first balanced, termination load circuit 46 bridges port 8a and a second balanced, termination load circuit 48 bridges port 8b. In general, the switch 8 operates as follows. The JFET's 40 and 42 act as gates which control the passage of signals between port 8a and port 8b, depending upon the state of the CTRL control signal. On the other hand, the termination load circuits 46 and 48 set the loading which is placed across ports 8a and 8b, also depending upon the state of the CTRL control signal. When the CTRL control signal is asserted, the switch 8 goes into the pass-through mode, meaning that the termination load circuits 46 and 48 impose near zero loading across ports 8a and 8b and the JFET's 40 and 42 are turned on, thereby coupling port 8a and port 8b together to permit signals to pass therebetween. However, when the CTRL control signal is deasserted, the switch 8 is in the isolation mode, so that the JFET's 40 and 42 are open, thereby electrically decoupling ports 8a and 8b from each other and preventing signals from passing therebetween. In addition, the termination loads circuits 46 and 48 are activated, thereby loading ports 8a and 8b with termination loads.

More specifically, port 8a of the switch comprises two lines 36a and 36b, which are connected to corresponding sides of the center-tapped winding 10c of the transformer 10 (see FIG. 1), and port 8b comprises two lines 38a and 38b, which are connected to the corresponding sides of the center-tapped winding 12c of the transformer 12. Within the PTI switch 8, the first JFET 40 connects line 36a with line 38a and the second JFET 42 connects line 36b with line 38b. The JFET's 40 and 42 are n-channel, depletion mode field-effect transistors, each having corresponding gate terminals 40a and 42a, source terminals 40b and 42b, and drain terminals 40c and 42c.

Bias resistors $R_2$ and $R_3$ are connected between the source and the gate of each of the JFETS 40 and 42. (In the preferred embodiment, the values of $R_2$ and $R_3$ are the same.) The gate terminals 40a and 42a are also each connected to a control line 44 through a resistor $R_1$ and two diodes $D_1$ and $D_2$, one diode being connected to each gate terminal 40a and 42a. The control line 44 receives the CTRL control signal which was described in connection with FIG. 1. The diodes $D_1$ and $D_2$ are oriented such that when the control line 44 is pulled to a negative voltage (i.e. when the CTRL control signal is deasserted), the diodes are forward biased thereby pulling the gate terminals 40a and 42a to a negative voltage and turning off the JFET's 40 and 42 which causes the drain-to-source resistance to increase. On the other hand, when the control line 44 is pulled to zero (as when power is removed from the circuit) or is pulled to a positive voltage (i.e. when the CTRL control signal is asserted), the diodes $D_1$ and $D_2$ become reverse biased thereby permitting the voltage level of the respective gate terminals 40a and 42a to float near zero which yields maximum conductivity through the JFET's 40 and 42. Thus, the JFET's 40 and 42 act as switches which electrically couple signals between port 8a and port 8b.

In one particular embodiment, the first termination load circuit 46 and the second termination load circuit 48 are identical. Each circuit is symmetrically designed and comprises four elements connected in series, namely, two resistors $R_4$ and $R_5$ and two back-to-back MOSFET's 50 and 52 (i.e. MOSFET's with their source terminals connected together). The MOSFET's 50 and 52 are matched enhancement mode, p-channel field effect transistors whose source terminals are connected together and whose gate terminals are connected together. The drain terminals of the MOSFET's 50 and 52 are connected to the lines of the corresponding ports 8a and 8b through one of the resistors $R_4$ and $R_5$. The values of the resistors $R_4$ and $R_5$ are the same, thereby making the load circuits 46 and 48 balanced and symmetrical as between the lines 36a and 36b.

The MOSFET's 50 and 52 are biased by means of three biasing resistors $R_6$, $R_7$, and $R_8$. Resistor $R_6$ connects between the source terminals of the two MOSFET's 50 and 52 and their gate terminals; resistor $R_7$ connects between the gate terminals and resistor $R_8$ which is, in turn, connected to ground. The biasing resistors normally keep the MOSFET's 50 and 52 in their off states so that the total resistance of each of the termination circuits 46 and 48 is high.

The control line 44 is connected to the node between resistors $R_7$ and $R_8$ through the parallel combination of a diode $D_3$ and a capacitor $C_1$. The diode $D_3$ is oriented so that when the voltage on the control line 44 goes negative (i.e. the CTRL control signal is deasserted), it also pulls the gate terminals of the two MOSFET's 50 and 52 negative, thereby turning the MOSFET's 50 and 52 on. In their on states, the resistance of each of the MOSFET's lies between 4 to 6 ohms, thus the total resistance of each of the termination circuits 46 and 48 is approximately 93 ohms which matches the impedance of the two lines 24 and 30, assuming that the lines 24 and 30 are coaxial lines. On the other hand, when the voltage on the control line 44 goes positive (i.e. the CTRL control signal is asserted), the diode $D_3$ becomes reverse biased and the biasing resistors $R_6$, $R_7$ and $R_8$ turn the MOSFET's 50 and 52 off and the termination resistances are effectively removed.

The capacitor $C_1$ increases the speed with which the MOSFET's 50 and 52 turn off by helping to pull negative charge out of the MOSFET's when the voltage level of the CTRL control signal switches from negated to asserted. The MOSFET's 50 and 52 must be able to switch quickly between their on states and their off states in order to reduce noise and to avoid interfering with communication signals going to and from the terminal. For example, the time it takes for the MOSFET's to turn on should be less than about 250 nanoseconds while the time it takes for them to turn off should be less than about 8 microseconds. With the component values shown in FIG. 2, the switch 8 is capable of operating at these desired speeds.

The PTI switch 8 operates as follows. When the CTRL control signal is asserted, that is, when it switches to a positive voltage, the switch 8 enters the pass-through mode. The JFET's 40 and 42 turn on, thereby electrically connecting the terminal 2 and the CCU 4 to each other, while the MOSFET's 50 and 52 turn off, thereby removing the 93 ohm termination resistances from across port 8a and port 8b. Since the on-resistance of the JFET's 40 and 42 is only about 2–3 ohms, the pass-through mode permits effective communication between the terminal 2 and the CCU 4 with little signal attenuation.

On the other hand, when the CTRL control signal is deasserted, that is, when it switches to a negative voltage, the switch 8 enters the isolation mode. The JFET's 40 and 42 turn off, thereby disconnecting the terminal 2 and the CCU 4 from each other, while the MOSFET's 50 and 52 turn on, thereby effectively imposing the 93 ohm termination resistance across each of the lines 24 and 30 to properly terminate the lines. As described earlier, when the switch 8 enters the isolation mode, both the keep-alive circuit 22 and the translator 18 are separately enabled thereby permitting the terminal 2 to communicate with the host 6 while the sessions which the terminal 2 had opened through the CCU 4 are kept active.

One advantage of the circuit which embodies the invention is that it significantly reduces switching transients on the interconnecting lines when the switch 8 is operated. This is in large part due to the symmetrical, balanced arrangement of the components within the circuit. In particular, each of the termination load circuits 46 and 48 is symmetrical and balanced meaning that the physical midpoint of the load circuit (i.e. where the source terminal of the two MOSFET's 50 and 52) is also the electrical midpoint of the load circuit. Any transients associated with one of the field-effect transistors in the switch tends to be canceled by similar transients coming from its counterpart in the circuit. In addition, each of the JFET's 40 and 42 and its corresponding control circuit (comprising resistors $R_1$ and $R_2$ and a diode $D_1$ in the case of JFET 40 and comprising resistors $R_1$ and $R_3$ and diode $D_2$ in the case of the JFET 42) are the same. This assures that the JFET's 40 and 42 simultaneously block signals on their corresponding lines and simultaneously turn on in response to the CTRL control signal.

Another advantage is that the circuit maintains proper termination on the lines thereby reducing reflected signals which could interfere with the desired operation of the system. For example, signals which are reflected back to the CCU 4 could mistakenly cause it to terminate sessions which the user of the terminal wishes to remain active while communicating with the host computer 6.

Yet another advantage of the circuit is that it automatically switches to the pass-through mode when power to the switch or its controlling circuitry is interrupted or shut down. As noted above, the JFET's are depletion mode devices which are normally on; therefore, when the power is off they remain in the conducting state, connecting the terminal to the CCU. The back-to-back MOSFET's, on the other hand, will always appear as two back-to-back diodes when no voltage is applied to their gate terminals. Thus, the MOSFET's will not clip or attenuate the pass-through signal levels. In other words, the terminal will automatically be switched into communication with the CCU when power is interrupted to the PTI switch. This is particularly appropriate since the keep-alive circuit would be disabled when power to it was removed and it would not be able to supply the polling required by the CCU to keep existing sessions active.

Having thus described illustrative embodiments of the invention, it will be apparent that various alterations, modifications and improvements will readily occur to those skilled in the art. Such obvious alterations, modifications and improvements, though not expressly described above, are nonetheless intended to be implied and are within the spirit and scope of the invention. Accordingly, the foregoing discussion is intended to be illustrative only, and not limiting; the invention is limited and defined only by the following claims and equivalents thereto.

What is claimed as new and desired to be secured by Letters Patent of the United States is:

1. An interface circuit for electrically connecting a computer terminal to and disconnecting the terminal from a network in response to a control signal, the interface circuit comprising a switching circuit having a first port for transmitting and receiving signals to and from the network and a second port for transmitting and receiving signals to and from the terminal, wherein the first port has a first line and a second line and the second port has a first line and a second line, the switching circuit comprising:
    a. a first gate, responsive to the control signal, for imposing a first impedance across the first port when the control signal is deasserted and for removing the first impedance from across the first port when the control signal is asserted;
    b. a second gate, responsive to the control signal, for imposing a second impedance across the second port when the control signal is deasserted and for removing the second impedance from across the second port when the control signal is asserted;
    c. a third gate, responsive to the control signal, for electrically coupling the first line of the first port with the first line of the second port when the control signal is asserted and for electrically isolating the first line of the first port from the first line of the second port when the control signal is deasserted; and
    d. a fourth gate, responsive to the control signal, for electrically coupling the second line of the first port with the second line of the second port when the control signal is asserted and for electrically isolating the second line of the first port from the second line of the second port when the control signal is deasserted.

2. The interface circuit as defined in claim 1 wherein the first gate comprises a first pair of first field-effect transistors which are connected back-to-back and the second gate comprises a second pair of second field-effect transistors which are connected back-to-back.

3. The interface circuit as defined in claim 1 wherein the third gate and the fourth gate each comprise substantially identical third field-effect transistors.

4. The interface circuit as defined in claim 1 further comprising:
    a. a first isolation transformer having a first winding and a second winding with a first center tap, wherein the first winding is for connecting to the network, the second winding is connected to the first port of the switching circuit and the first center tap is connected to ground; and
    b. a second isolation transformer having a fourth winding and a fifth winding with a second center tap, wherein the fourth winding is for connecting to the terminal, the fifth winding is connected to the second port of the switching circuit and the second center tap is connected to ground.

5. An interface circuit for electrically connecting a computer terminal to and disconnecting the terminal from a network in response to a control signal, the interface circuit comprising a switching circuit having a first port for transmitting and receiving signals to and from the network and a second port for transmitting and receiving signals to and from the terminal, wherein the first port has a first line and a second line and the second port has a first line and a second line, the switching circuit comprising:
    a. a first switchable termination load circuit for imposing a first impedance across the first port when the control signal is deasserted and for removing the first impedance from across the first port when the control signal is asserted;
    b. a second switchable termination load circuit, responsive to the control signal, for imposing a second impedance across the second port when the control signal is deasserted and for removing the second impedance from across the second port when the control signal is asserted;
    c. a first switching circuit, responsive to the control signal, for electrically coupling the first line of the first port with the first line of the second port when the control signal is asserted and for electrically isolating the first line of the first port from the first line of the second port when the control signal is deasserted; and
    d. a second switching circuit, responsive to the control signal, for electrically coupling the second line of the first port with the second line of the second port when the control signal is asserted and for electrically isolating the second line of the first port from the second line of the second port when the control signal is deasserted.

6. The interface circuit as defined in claim 5 wherein the first and second termination load circuits are each symmetrical, balanced circuits and wherein the first and second switching circuits are substantially identical.

7. An interface circuit for electrically connecting a computer terminal to and disconnecting the terminal from a network in response to a control signal, the interface circuit comprising a switching circuit having a first port for transmitting and receiving signals to and from the network and a second port for transmitting and receiving signals to and from the terminal, wherein the first port has a first line and a second line and the second port has a first line and a second line, the switching circuit comprising:
    a. a first switchable termination load circuit for imposing a first impedance across the first port when the control signal is deasserted and for removing the first impedance from across the first port when the control signal is asserted;

b. a second switchable termination load circuit, responsive to the control signal, for imposing a second impedance across the second port when the control signal is deasserted and for removing the second impedance from across the second port when the control signal is asserted;

c. a first switching circuit, responsive to the control signal, for electrically coupling the first line of the first port with the first line of the second port when the control signal is asserted and for electrically isolating the first line of the first port from the first line of the second port when the control signal is deasserted; and d. a second switching circuit, responsive to the control signal, for electrically coupling the second line of the first port with the second line of the second port when the control signal is asserted and for electrically isolating the second line of the first port from the second line of the second port when the control signal is deasserted.

wherein the first termination load circuit comprises a first pair of first field-effect transistors which are connected back-to-back and the second termination load circuit comprises a second pair of second field-effect transistors which are connected back-to-back and wherein the third gate and the fourth gate each comprise substantially identical third field-effect transistors.

* * * * *